United States Patent [19]

Wood

[11] Patent Number: 5,582,628

[45] Date of Patent: Dec. 10, 1996

[54] UNIT AND SYSTEM FOR SENSING FLUID VELOCITY

[76] Inventor: Tony J. Wood, 16277 Terrace Wood Dr., Eden Prairie, Minn. 55345

[21] Appl. No.: 388,177

[22] Filed: Feb. 10, 1995

Related U.S. Application Data

[63] Continuation-in-part of Ser. No. 706,795, May 29, 1991, Pat. No. 5,417,110.

[51] Int. Cl.$^6$ ............................................. G01F 1/00
[52] U.S. Cl. ................................... 73/204.18; 73/204.14; 73/204.23
[58] Field of Search ............................. 73/204.16, 204.18, 73/204.19, 204.21

[56] References Cited

U.S. PATENT DOCUMENTS

| | | | |
|---|---|---|---|
| 1,769,358 | 7/1930 | Pinkerton et al. | 73/204.18 |
| 3,056,295 | 10/1962 | Laub | 73/204.16 |
| 3,199,348 | 8/1965 | Salera | 73/204 |
| 3,400,582 | 9/1968 | Warner | 73/181 |
| 3,789,831 | 2/1974 | Kopaniky et al. | 73/204 |
| 3,800,592 | 4/1974 | Jones, Jr. | 73/181 |
| 3,945,252 | 3/1976 | Fiore | 73/204 |
| 4,016,759 | 4/1977 | Baker et al. | 73/204 |
| 4,074,566 | 2/1978 | Obayashi et al. | 73/116 |
| 4,245,502 | 1/1981 | Eiermann et al. | 73/204 |
| 4,373,387 | 2/1983 | Nishimura et al. | 73/204.19 |
| 4,393,702 | 7/1983 | Kohama et al. | 73/204 |
| 4,445,369 | 5/1984 | Stoltman et al. | 73/204 |
| 4,480,467 | 11/1984 | Harter et al. | 73/204 |
| 4,648,271 | 3/1987 | Woolf | 73/204 |
| 4,686,856 | 8/1987 | Vavra et al. | 73/204.19 |
| 4,733,559 | 3/1988 | Aine et al. | 73/204.19 |
| 4,805,452 | 2/1989 | Eiermann et al. | 73/204 |
| 4,864,855 | 9/1989 | Shiraishi et al. | 73/204 |
| 4,884,443 | 12/1989 | Lee et al. | 73/204.19 |
| 4,972,708 | 11/1990 | Wiegleb et al. | 73/204 |
| 4,986,122 | 1/1991 | Gust | 73/204 |
| 5,119,674 | 6/1992 | Nielsen | 73/204 |
| 5,339,687 | 8/1994 | Gimson et al. | 73/204.19 |

FOREIGN PATENT DOCUMENTS

| | | | |
|---|---|---|---|
| 1904029 | 8/1970 | Germany . | |
| 2649040 | 5/1978 | Germany | G01P 5/12 |
| 2728060 | 1/1979 | Germany | G01F 1/68 |
| 347732 | 12/1989 | Germany | G01F 1/68 |
| 1488012 | 10/1977 | United Kingdom | G01P 5/12 |

OTHER PUBLICATIONS

*Mass Flow Meters Come of Age,* Jan. 1990 Control Report, Brian K. Wolske, Editor, pp. 40–50.

*Primary Examiner*—Richard Chilcot
*Assistant Examiner*—Ronald Biegel
*Attorney, Agent, or Firm*—Merchant, Gould, Smith, Edell, Welter & Schmidt, P.A.

[57] ABSTRACT

A thermal anemometer having a large number of thermally isolated fins is placed in a fluid flow. The flow velocity is computed from the temperature of the fin tips and the fluid temperature along with knowledge of the amount of power supplied to the fins.

4 Claims, 5 Drawing Sheets

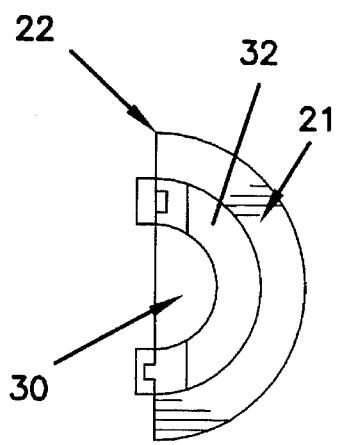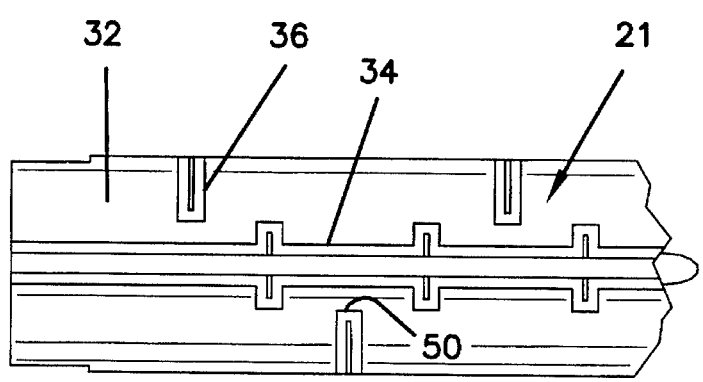
FIG. 3A    FIG. 3B
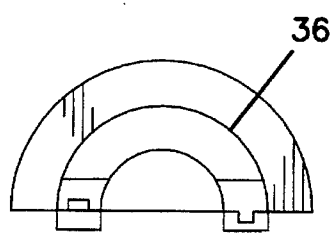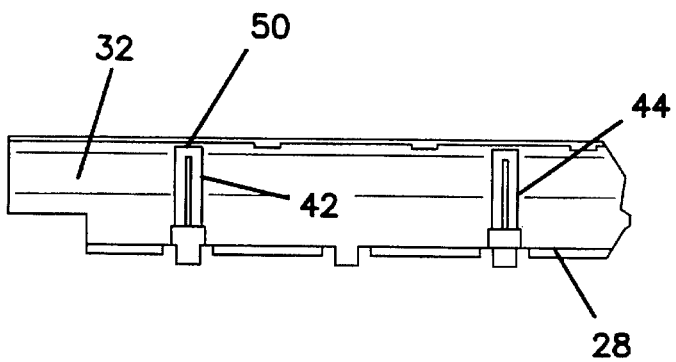
FIG. 4A    FIG. 4B
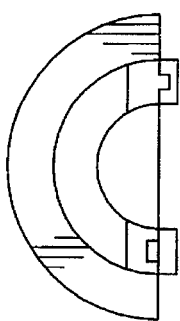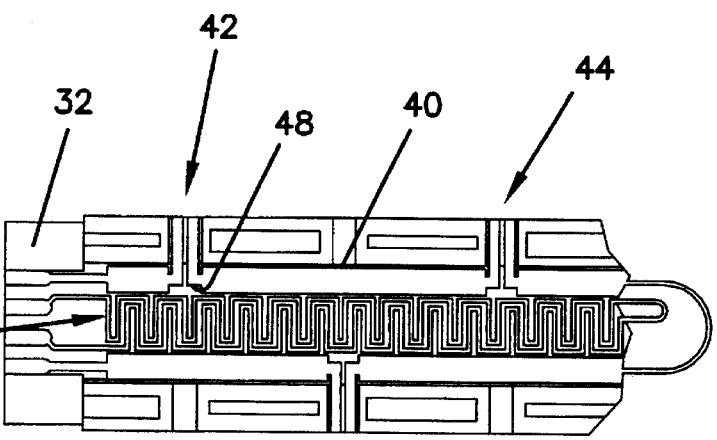
FIG. 5A    FIG. 5B

UNIT AND SYSTEM FOR SENSING FLUID VELOCITY

CROSS REFERENCE

This is a Continuation-In-Part of application Ser. No. 07/706,795, filed May 29, 1991, now U.S. Pat. No. 5,417,110, entitled UNIT AND SYSTEM FOR SENSING FLUID VELOCITY. This parent application is incorporated by reference herein, in its entirety.

FIELD OF THE INVENTION

The present invention relates to a method and apparatus for measuring fluid flows, and more particularly to a system for measuring gas flow in an enclosed duct.

BACKGROUND OF THE INVENTION

Thermal anemometers and pitot tubes have been used for many years for sensing fluid velocities within closed ducts. The pitot tube measures the difference between the dynamic pressure and the static pressure of a moving stream. This difference is proportional to the fluid velocity past the pitot tube. This pressure differential is proportional to fluid velocity. Thermal anemometers immerse a heater in a fluid stream. The heater transfers heat from a hot surface to the moving fluid stream. The amount of heat transferred by convection to the moving fluid stream is determined in part by the velocity of the moving fluid. Fluid flow velocity may be determined by providing a constant heat input and measuring the variation in temperature of the hot surface with respect to the fluid temperature (constant power method). Or alternatively, one may maintain the temperature of the hot surface at a constant, elevated value with respect to the fluid temperature and measure the heat input required to maintain the temperature elevation (constant temperature method).

Both pitot tubes and prior art thermal anemometers make a "local" measurement of fluid flow. Consequently, to compute mass flow rates within duct work, it is common to use multiple sensors to monitor flow at several locations along the cross-section of the duct.

There are three general forms of commercially available thermal anemometers for use in large ducts. In one form, a long thin sensing unit is constructed of flexible material and is formed to traverse the duct or pipe cross-section several times. The whole of the external surface of the anemometer exchanges heat with the fluid. Since more of the duct or pipe cross-section participates in heat transfer, a better estimate of average flow is obtained. These may be referred to as averaging anemometers. This type of sensor has a large thermal capacity which causes substantial errors when the fluid velocity changes. This type of prior art device is sometimes referred to as a "coaxial" device.

A second approach is to construct an array of multiple, small sensing units distributed throughout the duct or pipe cross-section. Signals from each of the sensing units are monitored and an average value is formed by a computing means. The principal disadvantage of this approach lies in it's complexity. Each sensing element has a heat source that must be controlled. Each sensing element must be individually monitored. Finally, a relatively complex computer must be used to first solve multiple equations for each of the sensing elements and then average those responses to obtain an estimate of the average flow velocity.

A third approach is to transport a small sensing unit to different locations throughout the duct or pipe cross-section. The flow measurement at each location is obtained and is stored or recorded. The average value is then computed from the stored measurements. This approach is not suitable for real-time measurement due to the mechanical complexity of the transport system and the time required to scan the duct.

SUMMARY

The present invention discloses a fluid velocity measurement system which includes a fluid flow sensor coupled to a measurement and control system. The fluid flow sensor may be used in relatively large ducts to replace a set of local sensors or it may be used in unconstrained stream of gas. The fluid flow sensor incorporates a heater, which is connected to a thermal collector. The thermal collector has a number of fins or radiator elements that are exposed to the fluid flow. Thermal insulation is provided between each of the radiator elements to isolate them from each other. Each of the fins or radiators has a first end thermally coupled to the thermal collector and a second end exposed to fluid flow. Thus the first ends of the fins or radiators are held at essentially the same constant temperature, at their heater end, while the temperature at the radiating end of each fin or radiator depends upon the local fluid temperature and fluid flow at that location. The electrical properties of the radiators and associated thermometers permit the computation of the temperature of the heater, as well as the temperature at the tip of the radiator. These two temperatures permit the solution of a flow equation, based upon a measurement of the amount of power dissipated by the heater into the radiators. These measurements and computations are carried out in a measurement and control system which generates signals indicative of flow.

BRIEF DESCRIPTION OF THE DRAWINGS

An illustrative and exemplary embodiment of the invention is shown in the figures and identical reference numerals represent identical structure throughout, wherein:

FIG. 3a shows an end view of a portion of the fluid flow sensor;

FIG. 3b shows a view of the external surface of the fluid flow sensor;

FIG. 4a shows an end view of a portion of the fluid flow sensor;

FIG. 4b shows a view of the external surface of the fluid flow sensor;

FIG. 5a shows an end view of a portion of the fluid flow sensor;

FIG. 5b shows a view of the interior surface of the fluid flow sensor;

DETAILED DESCRIPTION

Structural Features of the Invention

Figure 1:
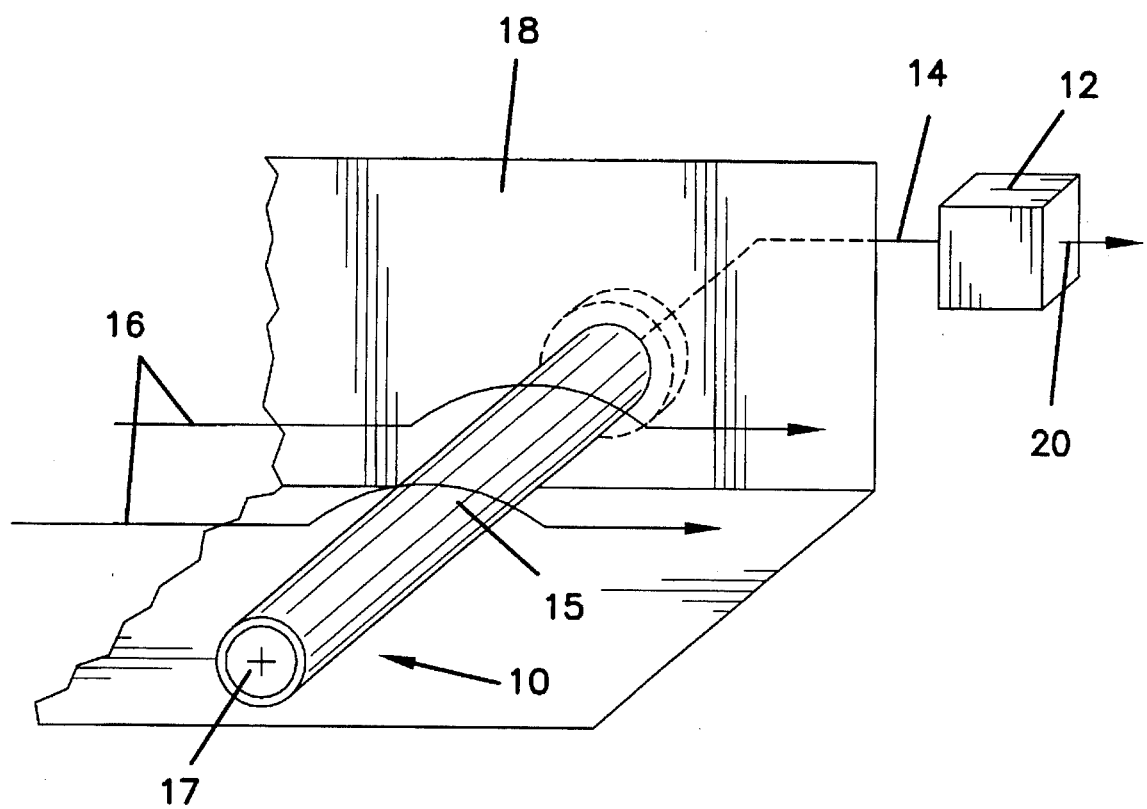
FIG. 1 shows the fluid velocity measurement system.

FIG. 1 show the fluid flow sensor 10 inserted into a large duct 18 which is shown as a cutaway. The fluid flow sensor 10 is connected to a measurement and control system 12 through an appropriate cable 14. The measured airflow 16 which passes over the fluid flow sensor is used to generate an output signal generated on output connection 20.

Figure 2:
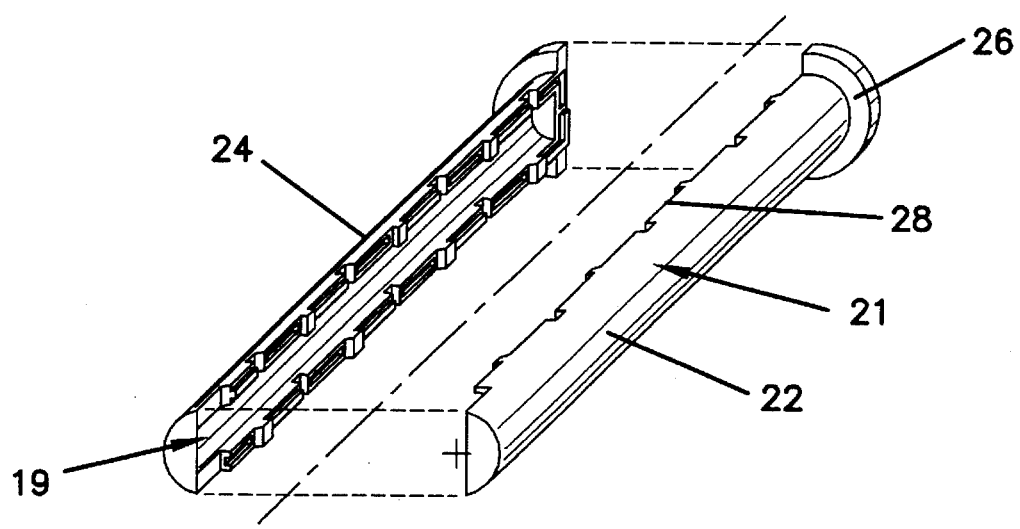
FIG. 2 shows an exploded view of the fluid flow sensor.

FIG. 2 is an exploded view of the generally cylindrical fluid flow sensor 10 showing complimentary first section 22 and complimentary second section 24. The seam 28 in FIG. 1 shows the parting line between the two complimentary pieces. The parting line forms a seam 28. The mounting flange 26 permits attachment of the fluid flow sensor 10 to the side wall of a duct 18. The circular cross section may be preferred for some applications but other cross section are useful as well. The body 17 of the fluid flow sensor is may up from the complimentary pieces so that an internal cavity 19 is provided. The internal cavity 19 helps evenly distribute heat among the base ends of the radiators or fins as described later. The body 17 may be covered with a tube 15 or coating to protect the fin elements. The tube 15 or coating should be thermally transparent and have a small thermal capacity. Many plastic materials meet these criteria.

FIG. 3a shows and end view of the first complimentary section 22 of the fluid flow sensor 10. The section 22 has an interior surface 30 and exterior surface 21. Each of these surfaces has metal bonded to the substrate insulator 32 or body. These metallic components and features are referred to as "traces" and may be deposited using conventional techniques. Experimental devices have been built using copper foil for the traces. The first trace 34 forms an ambient temperature thermometer (RTD1). A portion of the second trace 36 is shown as well and this segment is referred to as a "fin" or "radiator".

FIG. 4a shows the first section 22 rotated through forty five degrees. FIG. 4b shows the external surface of the rotated that the fin segment of the second trace 36 extends over the seam 28 and enters the interior of the fluid flow sensor 10.

FIG. 5a show the first section 22 rotated through another forty five degrees. FIG. 5b shows the internal surface 30 of the first section 22 where the second trace 36 joins a metallic thermal collector 40. the thermal collector connects each of the "fins" together thermally and in this embodiment electrically as well. The traces typically form continuous electrical circuits. Consequently the fin 42 is electrically in series with fin 44. However thermally these fins are isolated from each other by the substrate insulator 32 forming the body 17 of the first complimentary section 22. Trace 38 forms a resistive heater 46 on the interior of the substrate 32. This trace may be made of a material more resistive than copper. This heater 46 is in close proximity to the base of each of the fins typified in the drawing by base 48. The thermal collector 40 connects each of the fins thermally and is sized to equalize the temperature of the bases of the fins.

In brief summary the fluid flow sensor has an elongate body 17 which is formed of a thermally and electrically insulating material. A heater 38 is located in the core or cavity 19 of the fluid flow sensor 10 where it thermally couples to the bases 48 of the radiators or fins 42. The tips of the fins lie on an exterior surface 21 of the body 17 as typified by tip 50. These tips are exposed to the airflow 16 where they transfer heat into the airflow 16 either directly or through an intermediate layer formed by a tube 15 or the like. The tips of the fins are thermally isolated from each other and each interacts with a different portion of the airflow. A ambient airflow temperature measuring device is supplied by the first trace 34 (RDT1). The second trace which electrically includes all the fins can be monitored as a thermometer as well (RDT2). The measurement and control system 12 supplies the power for the third heater 46 trace and measures the temperature of the of first trace 34 and second trace 36. Since the heater 46 is provided along the length of the flow sensor 10, the thermal collector 40 is used to distribute and equalize the temperature of the base of the fins typified by fin 42. In this particular embodiment the fin has a first end or base 48 connected to the thermal collector 40 in a serpentine fashion forming a series circuit. The second end or tip 50 is also part of the serpentine path and it exits the cavity 19 and is exposed to the fluid flow 16 on the exterior surface 21 of the body 17. The fins are mounted on an insulator 32 which thermally isolates the tips of the various fins form the adjacent fin tip.

This construction results in a thermal anemometer which may be arbitrarily long. The thermal collector 40 is a long thin strip of thermally conductive material (e.g., copper), thermally joined to a distributed array of multiple, thermally conductive radiator elements (e.g., small fins). This composite assembly is attached to a strip heating element 46. The heating element 46 and attached thermal collector 40 is fully enclosed in an insulating substrate 32 with the tips of the radiators exposed to the fluid flow 16.

Although heat may be generated, conducted and exchanged with the fluid stream over a large, distributed area within the duct or pipe, there is not a lot of radiator surface area associated with the structure. The fins provide multiple, distributed, small areas for convective heat transfer to the fluid stream. When the heater 46 and thermal collector 40 assembly is enclosed inside the thermally insulating substrate 32 with only the tips of the fins exposed to the fluid, a composite heat transfer surface is created that is fundamentally different than the prior art structures.

Theory of Operation

Figure 7:
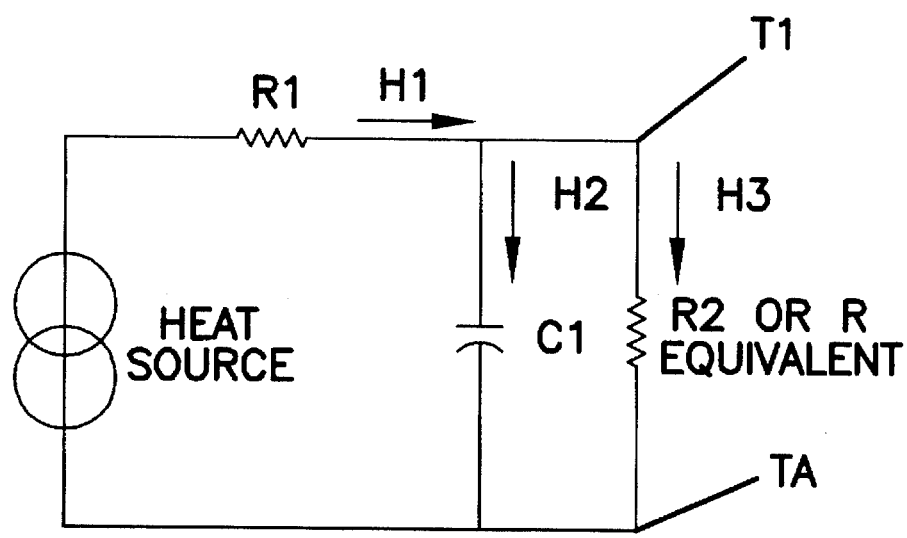
FIG. 7 is a schematic model of an anemometer.

A more through understanding of the operation of the invention may result from a consideration and comparison between prior art anemometers and the present invention. FIG. 7 represents an equivalent thermal model of the operation of anemometers. It is important to appreciate that this is not an electrical schematic of the invention but rather a model for the discussion of heat flow.

FIG. 7 is a lumped parameter model of a generic thermal anemometer. For heat flow by conduction, thermal resistance is defined by the relationship:

$$R = \frac{\Delta x}{A * k_m} \quad (A)$$

where R is the resistance, $\Delta x$ is the thickness of the element (i.e., distance through the element in the direction of the heat flow), A is the area of the element normal to the direction of heat flow that the heat flows through, and $k_m$ is the thermal conductivity of the material m.

For heat flow by convection, thermal resistance is defined by the relationship:

$$R = \frac{1}{A * h} \quad (B)$$

where R is the resistance, A is the area of the element convecting heat, and h is the convective heat transfer coefficient.

Thermal capacitance is defined by the relationship:

$$C = c_m * d_m * V \quad (C)$$

where C is the capacitance, $c_m$ is the specific heat of the material m, $d_m$ is the density of the material m, and V is the volume of the element.

The elements of the schematic are defined as follows:

R1 represents the resistance to the flow of heat from the heat source 12 through the thermal conductor 14 normal to the indicated fluid flow direction.

C1 is the capacitance of the thermal conductor 14.

R2 is the resistance to the flow of heat by convection to the moving fluid from the surface of the thermal conductor 14 exposed to the fluid.

R3 is the resistance to the flow of heat from the heat source 12 through the substrate 16.

R4 is the resistance to the flow of heat from the thermal conductor 12 through the substrate 16.

C2 is the capacitance of the substrate 16.

R5 is the resistance to the flow of heat by convection to the moving fluid from the surface of the substrate 16 exposed to the fluid.

FIG. 7 assumes that the primary path for heat transfer from the heat source to the moving fluid is through the thermal conductor and so that heat transfer through the insulating substrate to the moving fluid is minimized.

Consequently for FIG. 7:

H1 is the heat flow through R1, the resistance of the thermal conductor.

H2 is the heat flow through C1, the capacitance of the thermal conductor;

H3 is the heat flow through R2, the resistance to the heat transfer to the fluid stream 16 by convection;

T1 is the surface temperature of the thermal conductor and

TA is the ambient temperature of the fluid.

In practical terms, H1 is the heat generated by the heat source H2 is the heat that charges/discharges the thermal capacitance of the thermal conductor and H3 is the heat transferred by convection from the surface of the thermal conductor.

The value of R2, the resistance to heat flow by convection from the surface of the thermal conductor to the moving fluid, changes as a function of the fluid velocity, since h, the convective heat transfer coefficient, changes as a function of the fluid velocity. This relationship may be expressed as:

$$\frac{1}{R2} = A * h = f(V_f(t)) \tag{D}$$

If R2 can be determined over time t, then a measure of the fluid flow velocity over time t, $V_f(t)$, can be determined. The following derivation develops the characteristic equation for 1/R2:

$$H1 = H2 + H3 \tag{E}$$

$$H2 = C1 * \frac{d}{dt}(TA(t) - T1(t)) \tag{F}$$

$$H3 = \frac{(TA(t) - T1(t))}{R2} \tag{G}$$

$$H1 = C1 * \frac{d}{dt}(TA(t) - T1(t)) + \frac{(TA(t) - T1(t))}{R2} \tag{H}$$

$$T_r(t) = (TA(t) - T1(t)) \tag{I}$$

$$f(V_f(t)) = \frac{1}{R2} = \frac{H1}{T_r(t)} - \left(\frac{C1}{T_r(t)}\right) * \left(\frac{d}{dt} T_r(t)\right) \tag{J}$$

Thus, the flow velocity is a function of the heat input (H1), the capacitance of the thermal conductor (C1), the temperature rise above the fluid temperature of the surface of the thermal conductor exposed to the fluid ($T_r(t)$), and the rate of change of the temperature rise of the surface of the thermal conductor, $$\left(\frac{d}{dt} T_r(t)\right).$$

This expression (J) demonstrates the principles of the prior art structures. In this context the size of the anemometer must be small to make the term C1 small. For small devices, the thermal capacitance C1 becomes small and the effect of the second term on the right hand side of Equation (J) on the velocity measurement is minimized and improves the dynamic response of the thermal anemometer.

$$f(V_f(t)) = \frac{1}{R2} \approx \frac{H1}{T_r(t)} \tag{K}$$

In the case of a larger thermal anemometers, R2 is small and C1 is large, therefore the power that must be supplied to the heater to generate heat flow H1 must be large to develop a temperature rise ($T_r(t)$) and change in temperature rise (d/dt $T_r(t)$) that can be detected. Thus the prior art large scale thermal anemometer have a large current draw and sluggish performance in rapidly fluctuating fluid flows. Although the equivalent circuit of can be used to model these devices, the model shows why each suffers from different performance problems when used to measure flow in ducts.

The model of FIG. 7 may also be used to illustrate the present invention using similar conventions as in the previous discussion. For the invention R1 is the lumped resistance to heat flow by conduction through the assembled thermal collector 40 and radiators 24. C1 is the thermal capacitance of the assembled thermal collector 40 and fins 42. R2, R3, . . . RN are the individual resistance of convective heat transfer of each of the exposed second ends typified by the fins or radiators. This model may be simplified by replacing R2 by Requivalent. For suitable choice of the number and size of the fins or radiators, Requivalent will have a value that is much, much greater than R2, the resistance to convective heat transfer, of the conventional anemometer.

In other words, the composite heat transfer surface may be viewed as a distributed array of high resistance elements connected in parallel to a common capacitance. The thermal anemometer of FIGS. 1–5 can be characterized by Equation (J) by the substitution of Requivalent for R2.

This composite heat transfer surface is a different construction and operates differently than either of the two prior art approaches. In practice the sensing unit can be optimize by trading off the number, geometry, and location of the studs or fins to achieve a good approximation of the average fluid flow, while:

maintaining a large Requivalent compared to R2, the resistance to convective heat transfer, of the coaxial thermal anemometer;

maintaining a lower heat input, H1, compared to the co-axial thermal anemometer to develop a temperature rise ($T_r(t)$) and change in temperature rise (d/dt $T_r(t)$) that can be detected; and eliminating most of the complexity of the interconnecting wiring, tolerance of multiple sensing elements, and control/computing means of the distributed, multiple element array.

Figure 6:
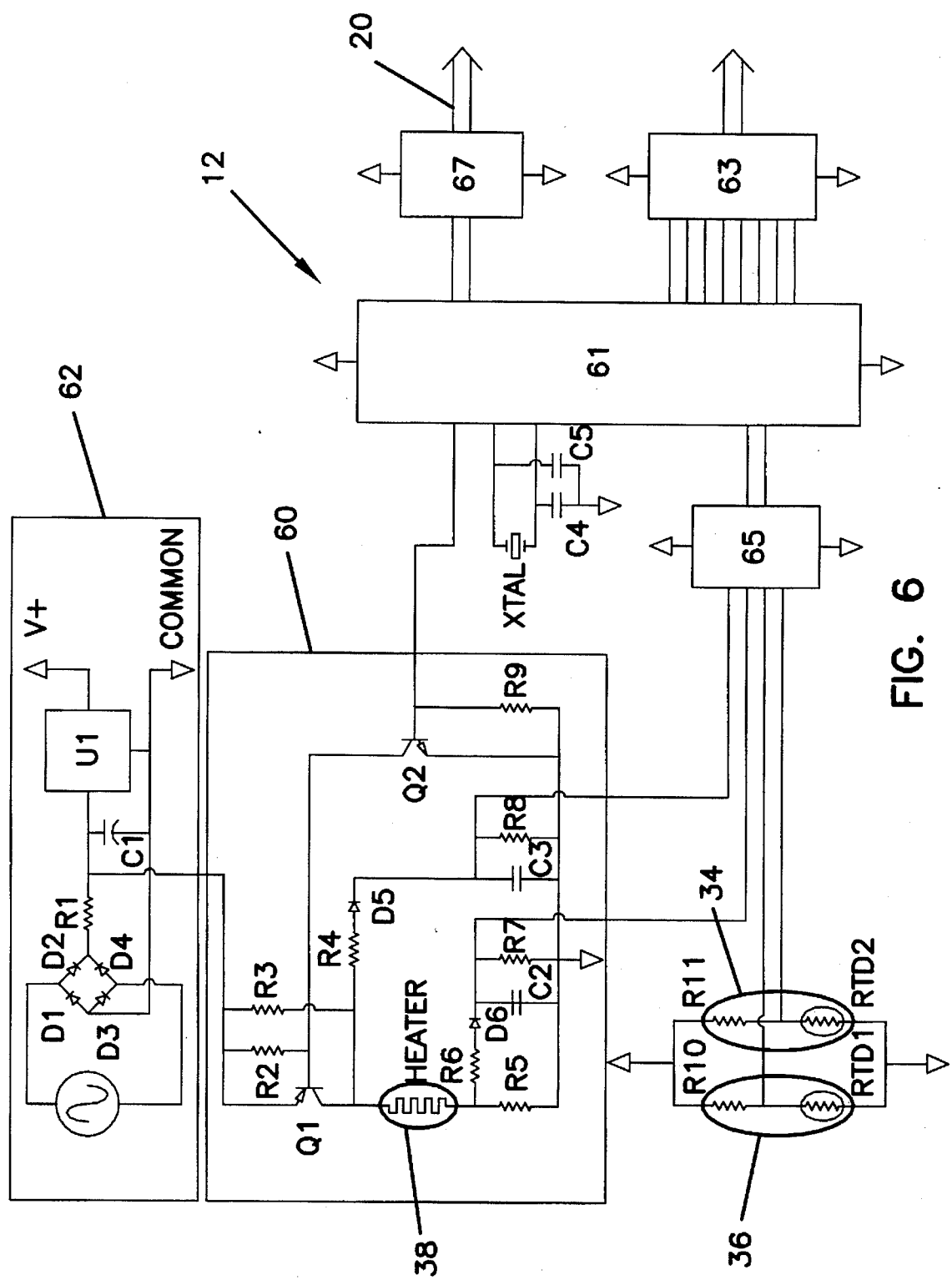
FIG. 6 is an electrical schematic of the fluid flow sensor in combination with the measurement and control system.

FIG. 6 shows a microprocessor based measurement and control system which includes a micro-controller 61 which operates under the control of a stored program located in memory circuit 63. The micro-controller 61 modulates current through the heater trace 38 by way of regulator circuit 60. An oscillator 62 may provide periodic energy to the heater 38. Both AC and DC operation of the heater trace 38 are contemplated within the scope of the invention. The ambient temperature thermometer trace 34 and the heat transferring second trace 36 from a bridge circuit and are coupled through an interface circuit 65 to the micro-controller 61. The computed airflow measurement is communicated via output circuit 67. The microprocessor is programed to solve equation (J) from the data available from the fluid flow sensor 10.

As discussed above the reduced form of the characteristic equation, Equation (K) is typically used to process information from the prior art sensing units. Where C1 is small, negligible error compared to Equation (J) results. This is the case for a single point type measurement or for average measurements obtained with a distributed, array of sensing units. Where C1 is large, the error compared to Equation (J) is quite large during transients in fluid velocity. This is the case for the larger prior art thermal anemometer. This type of sensor is therefore only useful where the fluid flow does not change or where a sampling interval that is large with respect to the duration of the transients can be used (i.e., sampling intervals of minutes to hours).

With the fluid flow sensor 10 constructed as described herein and in the parent patent application, it is feasible to use Equation (J) directly. As shown above, since we can now:

maintain a large Requivalent compared to R2, the resistance to convective heat transfer, of the coaxial thermal anemometer, and maintain a lower heat input, H1, compared to the co-axial thermal anemometer to develop a temperature rise ($T_r(t)$) and change in temperature rise ($d/dt\, T_r(t)$) that can be detected, We can use Equation (J) and obtain an accurate measure of the average fluid flow even for large, known values of C1 over a very small sample interval. In other words we can obtain a measure of the average fluid flow that is much more responsive than the coaxial thermal anemometer, that is as responsive as that obtained by the single point or multiple, distributed array of sensing units, that is more accurate than the co-axial thermal anemometer, and that is as accurate or more accurate than the single or multiple, distributed array of sensing units.

Figure 8:
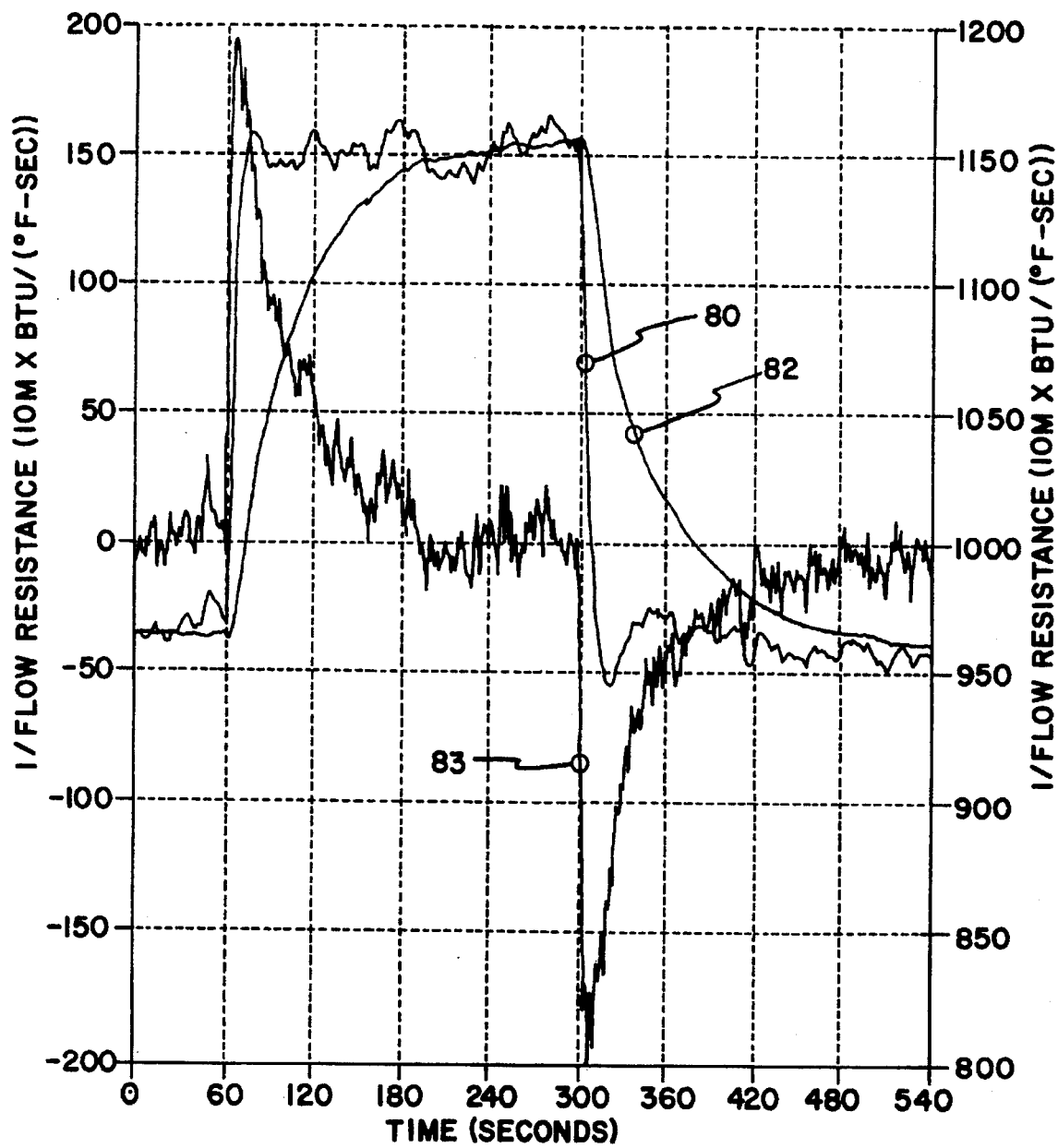
FIG. 8 is a plot of experimental data.

A concept model of the design described above has been constructed and evaluated in the laboratory and FIG. 8 illustrates representative test data from this concept model. In this experiment, the velocity of a column of air was rapidly increased at time=60 sec and rapidly decreased to it's initial value at time=300 sec. The temperature of the air and the temperature of the surface of the thermal conductor exposed to the air stream was sampled and stored every 1 second.

Equation (J) was used with the stored data to compute the value of $$\frac{1}{R2}.$$

The curve 82 in FIG. 8 is the value of the term $$\frac{H1}{T_r(t)}$$

in Equation (J).

The curve 83 in FIG. 8 is the value of the term $$\left(\frac{C1}{T_r(t)}\right) * \left(\frac{d}{dt}\, T_r(t)\right)$$

in Equation (J).

The curve 80 in FIG. 8 is the sum of the two terms or the value of $$\frac{1}{R2}.$$

The experimental results from the concept model correlate well with the expected response from the analytical model. These results clearly show the ability to measure fluid flow.

What is claimed is:

1. A fluid flow sensor for measuring a fluid flow comprising:

a insulating body having an exterior surface;

a heater;

a plurality of fins each fin having a base and each fin having a tip forming a fin tip, each fin tip being located proximate said exterior surface of said insulating body;

each base thermally coupled to said heater;

a thermal collector coupled to each base of each fin;

whereby each base has substantially the same temperature of each other base;

each fin tip exposed to said fluid flow;

each fin tip thermally isolated from adjacent fin tips, by said insulating body;

a first thermometer thermally coupled to said fluid flow for measuring the temperature of said fluid flow;

a second thermometer thermally coupled to said plurality of fins for measuring the temperature of all of said fin tips.

2. A fluid flow sensor for measuring a fluid flow comprising:

a insulating body having an exterior surface;

a heater;

a plurality of fins each fin having a base and each fin having a tip forming a fin tip, each fin tip being located proximate said exterior surface of said insulating body;

each fin electrically connected in series to an adjacent fin thereby forming a second thermometer thermally coupled to said plurality of fins for measuring the temperature of all of said fin tips;

each fin tip exposed to said fluid flow;

each fin tip thermally isolated from adjacent fin tips;

a first thermometer thermally coupled to said fluid flow for measuring the temperature of said fluid flow.

3. A fluid flow sensor for measuring a fluid flow comprising:

a insulating body having an exterior surface and an interior cavity;

a heater located in said interior cavity;

a plurality of fins each fin having a base and each fin having a tip forming a fin tip, each fin tip being located proximate said exterior surface of said insulating body;

each fin tip exposed to said fluid flow;

each fin base electrically connected in series to an adjacent fin base, forming a serpentine path in which each base is located in said cavity and each tip is located proximate said exterior surface;

said serpentine path thereby forming a second thermometer thermally coupled to said plurality of fins for measuring the temperature of all of said fin tips;

each fin tip thermally isolated from adjacent fin tips by its location on said exterior surface;

a first thermometer thermally coupled to said fluid flow for measuring the temperature of said fluid flow.

4. A method of measuring fluid flow comprising:

distributing heat to a plurality of isolated fin tips;

exposing said fin tips to said fluid flow;

measuring the temperature of said fin tips;

measuring the temperature of said fluid flow;

measuring the amount of power supplied to said fin tips;

computing the fluid flow velocity from said fluid temperature, said fin tip temperature, and said power measurements.

* * * * *

UNITED STATES PATENT AND TRADEMARK OFFICE
CERTIFICATE OF CORRECTION

PATENT NO. : 5,582,628

DATED : 10 December 1996

INVENTOR(S) : Wood

It is certified that error appears in the above-identified patent and that said Letters Patent is hereby corrected as shown below:

Column 2, Line 65 "show" should read --shows--.

Column 3, Line 36 "show" should read --shows--.

Column 3, Lines 5, 6, 7, 13, 20, 45 "complimentary" should read --complementary--.

Column 3, Line 11 "cross section" should read --cross sections--.

Column 3, Line 12 "may" should read --made--.

Column 3, Line 33 insert --portion so-- after the word "rotated".

Column 4, Line 2 delete "of" before the word "first".

Column 4, Line 13 "form" should read --from--.

Column 6, Line 23 delete "of" after the word "circuit".

UNITED STATES PATENT AND TRADEMARK OFFICE
CERTIFICATE OF CORRECTION

PATENT NO. : 5,582,628

DATED : 10 December 1996

INVENTOR(S) : Wood

It is certified that error appears in the above-identified patent and that said Letters Patent is hereby corrected as shown below:

Column 6, Line 45 "optimize" should read --optimized--.

Column 7, Line 3 "from" should read --form--.

Column 7, Line 34 "(d/dr $T_r$ (t))" should read --d(d/dt $T_r$(t))--.

Signed and Sealed this

Fourteenth Day of October, 1997

BRUCE LEHMAN

*Attest:*

*Attesting Officer*  *Commissioner of Patents and Trademarks*